(12) United States Patent
Rittmann

(10) Patent No.: US 8,394,273 B2
(45) Date of Patent: Mar. 12, 2013

(54) METHOD AND SYSTEM FOR SURFACE WATER TREATMENT

(76) Inventor: Bruce E. Rittmann, Tempe, AZ (US)

( * ) Notice: Subject to any disclaimer, the term of this patent is extended or adjusted under 35 U.S.C. 154(b) by 235 days.

(21) Appl. No.: 12/920,075

(22) PCT Filed: Feb. 26, 2009

(86) PCT No.: PCT/US2009/035228
§ 371 (c)(1),
(2), (4) Date: Aug. 27, 2010

(87) PCT Pub. No.: WO2009/111256
PCT Pub. Date: Sep. 11, 2009

(65) Prior Publication Data
US 2011/0006001 A1 Jan. 13, 2011

Related U.S. Application Data

(60) Provisional application No. 61/033,623, filed on Mar. 4, 2008.

(51) Int. Cl.
C02F 3/02 (2006.01)
(52) U.S. Cl. ............... 210/615; 210/747.5; 210/150; 210/170.09
(58) Field of Classification Search ............... 210/615, 210/747.5, 150, 151, 170.09, 170.1, 170.11
See application file for complete search history.

(56) References Cited

U.S. PATENT DOCUMENTS

| | | | |
|---|---|---|---|
| 3,633,884 A * | 1/1972 | Holmes et al. | 210/170.09 |
| 4,181,604 A * | 1/1980 | Onishi et al. | 210/615 |
| 5,478,473 A * | 12/1995 | Oshima | 210/170.09 |
| 5,549,828 A * | 8/1996 | Ehrlich | 210/170.09 |
| 6,645,374 B2 * | 11/2003 | Cote et al. | 210/151 |
| 6,821,426 B1 * | 11/2004 | Hausin et al. | 210/170.09 |
| 7,338,597 B1 * | 3/2008 | Rittmann et al. | 210/150 |
| 2004/0229343 A1 * | 11/2004 | Husain et al. | 210/615 |
| 2005/0269263 A1 * | 12/2005 | Rittmann et al. | 210/903 |
| 2006/0021936 A1 * | 2/2006 | Husain et al. | 210/615 |

* cited by examiner

*Primary Examiner* — Christopher Upton
(74) *Attorney, Agent, or Firm* — Snell & Wilmer L.L.P.

(57) ABSTRACT

A method, apparatus, and system for removing contaminants from a body of surface water. The method and apparatus may include tubular members such as hollow-fiber components. The tubular members have a reactive gas diffused through wall of the member. Contaminants in the water can be removed when the reactive gas reacts with bacteria on the tubular member.

20 Claims, 2 Drawing Sheets

METHOD AND SYSTEM FOR SURFACE WATER TREATMENT

CROSS-REFERENCE TO RELATED APPLICATIONS

This application is U.S. national phase filing under 35 U.S.C. §371 of PCT/US2009/035228 filed Feb. 26, 2009, which claims priority to U.S. Provisional Patent Application No. 61/033,623 filed on Mar. 4, 2008, the disclosure of which is herein incorporated by reference.

BACKGROUND INFORMATION

Surface waters throughout the world are contaminated with nutrients that come from a range of non-point sources (e.g., agricultural and storm water run-off, high-density animal operations, and atmospheric deposition), and inadequately treated wastewaters. Chief among the contaminants is nitrogen, which is present as nitrate ($NO_3^-$), nitrite ($NO_2^-$), and ammonium ($NH_4^+$). Excess concentrations of these nutrients cause eutrophication of natural water bodies, particularly the ocean, estuaries, lakes, and reservoirs. Up to the present time, no reliable means is available to remove these nitrogen-containing compounds from surface water once the water is contaminated from one or more of the sources. Limited removal is possible when the water passes through natural or engineered wetlands, but normally these systems are able to remove only a modest fraction of the total nitrogen load in the surface water.

SUMMARY

Embodiments of the present disclosure comprise a Membrane Biofilm Reactor (MBfR), which can be used to remove nitrogen-containing contaminants from waters. More specifically, embodiments comprise an MBfR that can be used to remove contaminants from open bodies of surface water. Methods and apparatus for treating such contaminants are disclosed in an "end of the pipe" process in U.S. Pat. Nos. 6,387,262 and 7,186,340; U.S. Patent Publication 2005/0269263; and U.S. patent application Ser. No. 10/876,745, each of which are herein incorporated by reference. Such methods and apparatus are only designed and intended to treat for contaminants in water within a closed system, such as a pipeline. The methods and apparatus disclosed in the references mentioned above are not suited for treatment of contaminated water in an open body of water.

DESCRIPTION OF ILLUSTRATIVE EMBODIMENTS

Figure 1:
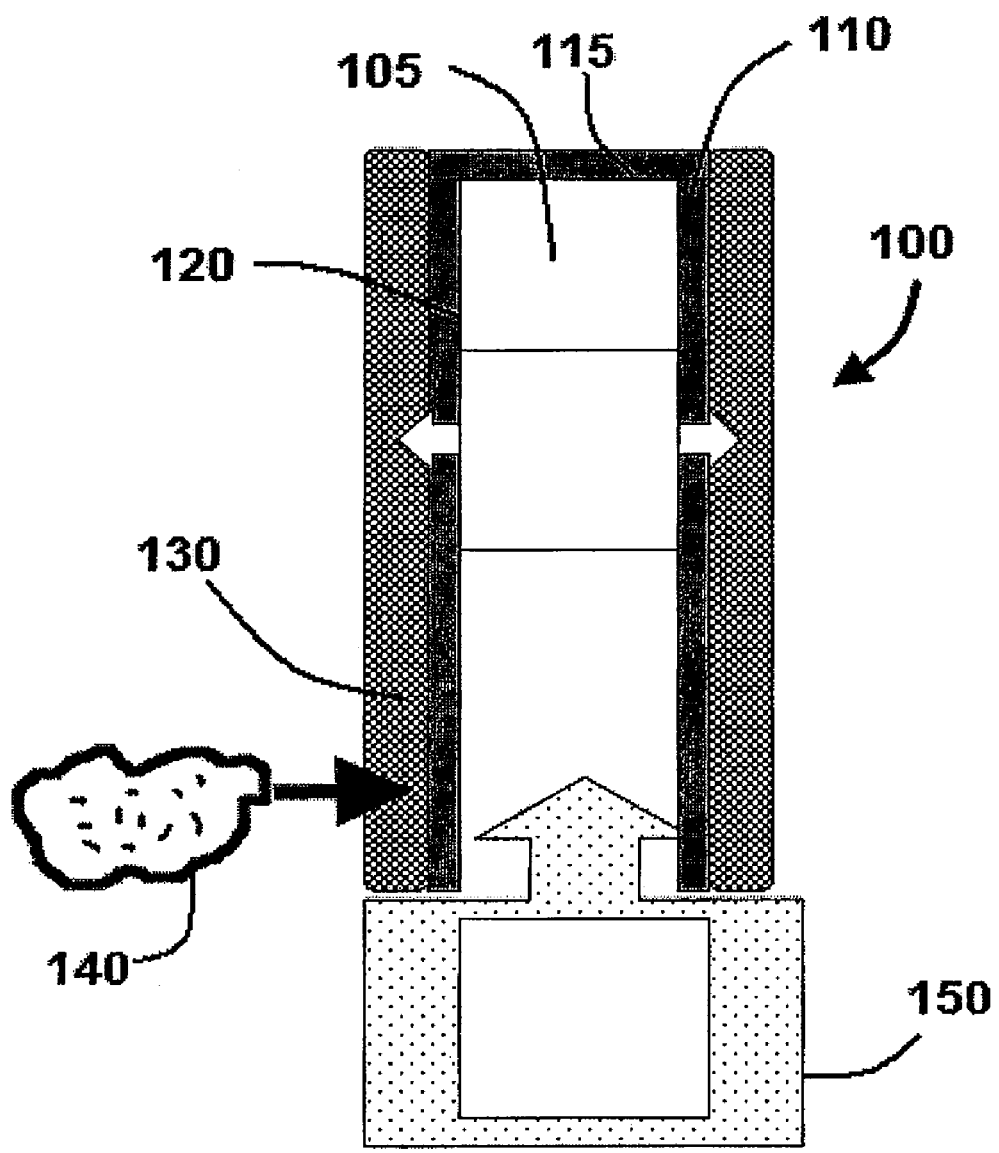
FIG. 1 illustrates a cross-section of a hollow fiber component according to embodiments of this disclosure.

As illustrated in the exemplary embodiment of FIG. 1, an MBfR 100 is coupled to a source of reactive gas 150. Reactive gas 150 is delivered to a lumen 105 of tubular member or a hollow fiber 110 in the MBfR 100 and diffuses through the wall 120. In exemplary embodiments, hollow fiber 110 may comprise an end member 115 such as a cap, plug, or other sealing member to restrict gas 150 from exiting lumen 105 without diffusing through wall 120. It is understood that the term "hollow" as used herein is to be interpreted broadly and does not require that the fiber or member be completely void of material in the lumen or central portion. For example, a hollow fiber may comprise a porous material in the lumen that is capable of allowing the reactive gas to pass through the material and diffuse through the wall. It is also understood that the hollow fibers may be of various sizes. For example, in certain embodiments, hollow fibers 110 may have a diameter of approximately, 10 µm, 20 µm, 30 µm, 40 µm, 50 µm, 100 µm, 150 µm, 200 µm, 250 µm, 260 µm, 270 µm, 280 µm, 281 µm, 290 µm, 300 µm, 350 µm, 400 µm, 450 µm, 500 µm, 550 µm, 600 µm, 650 µm, 700 µm, 750 µm, 800 µm, 850 µm, 900 µm, 950 µm, or 1 mm, 2 mm, 3 mm or more. In other embodiments, hollow fibers 110 may be any diameter within the range of 10 µm to 3 mm. A tubular member or hollow fiber according to embodiments of the present disclosure may also be of various cross-sectional shapes, including circular, triangular, square, hexagonal, octagonal or other polygonal shapes.

The reactive gas 150 is consumed by bacteria that grow in a biofilm 130 on the outer surface of the wall 120. In certain embodiments, wall 120 comprises a bubbleless gas-transfer membrane. In specific embodiments, wall 120 comprises a composite bubble-less membrane comprising a dense polyurethane approximately 1-µm thick and a microporous polyethylene with a pore size of approximately 0.1-0.15 µm. In still other embodiments, wall 120 comprises a polyester fiber. In other embodiments, wall 120 may comprise cellulose triacetate (CTA).

The consumption of reactive gas 150 is linked to the transformation of one or more contaminants 140 in the water that surrounds the wall 120 into non-toxic or harmless end products. In certain embodiments, the reactive gas 150 may be hydrogen ($H_2$) or oxygen ($O_2$). When $H_2$ is the reactive gas, autotrophic, $H_2$-oxidizing bacteria accumulate in the biofilm, and they reduce $NO_3^-$ and $NO_2^-$ to harmless $N_2$ gas, which evolves from the water, bringing about total-nitrogen removal. At the same time, other oxidized contaminants can be reduced if they also are present in the water. Examples of such oxidized contaminants are selenate ($SeO_4^{2-}$), perchlorate ($ClO_4^-$), chromate ($CrO_4^{2-}$) trichloroethene (TCE, $C_2Cl_3H$), trichloroethane (TCA, $C_2Cl_3H_3$), chloroform (CF, $CHCl_3$), dichloroethene (DCE, $C_2H_2Cl_2$), vinyl chloride (VC, $C_2H_3Cl$), dibromochloropropane (DBCP, $C_3H_5Br_2Cl$), and nitrosodimethyl amine (NDMA).

When the reactive gas 150 is $O_2$, autotrophic, aerobic bacteria can oxidize $NH_4^+$ to $NO_2^-$ or $NO_3^-$, both of which can be reduced subsequently to $N_2$ gas, as described above. In addition, other reduced contaminants can be oxidized if they are present in the water. Examples of such reduced contaminants are benzene ($C_6H_6$), phenol ($C_6H_6O$), and general organic matter, represented as biochemical oxygen demand (BOD).

Biofilm 130 provides an efficient interface for contaminant 140 from the water and the gaseous substrate of wall 120 that the bacteria in the biofilm 130 utilize to reduce or oxidize contaminants 140.

While the MBfR has been conceived of and practiced for a range of "end of pipe" treatments (i.e., the previously cited patents and applications), embodiments of this disclosure present the concept of using the membrane-biofilm for in situ treatment of contaminated surface waters. The in situ MBfR (isMBfR) may provide a viable solution for pollution that already has been released to surface water and is no longer subject to collection for end-of-pipe treatment.

In exemplary embodiments of the isMBfR, membrane fibers are mounted in special cassettes that can be placed in the surface water in a location appropriate for decontamination and not conflicting with other uses of the water right of way, such as boating. Exemplary embodiments provide appropriate locations, including within natural or artificial wetlands, suspended underneath an artificial island, suspended underneath a boat that is moored or mobile, and within side channels designed for in situ treatment. Details of the design of the cassettes will depend on the location, but exemplary embodiments comprise cassettes of hollow fibers that can be secured and operated in the in situ surface-water environment.

Figure 2:
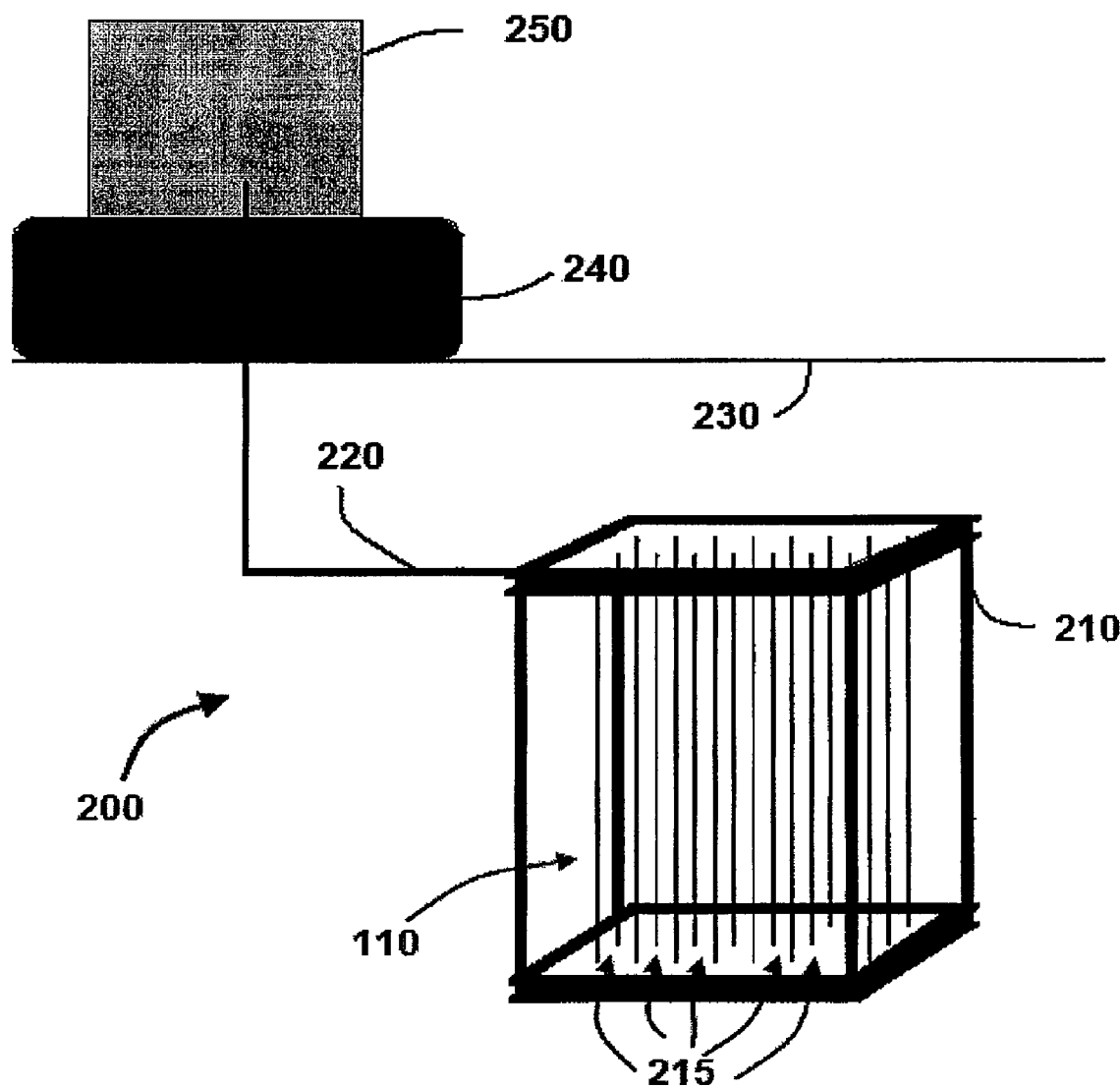
FIG. 2 illustrates a schematic of a system according to embodiments of this disclosure.

Referring now to the exemplary embodiment in FIG. 2, an isMBfR 200 comprises a plurality of hollow fibers 110 arranged in a cassette 210 submerged in surface water 230. As is understood by those skilled in the art, surface water 230 may be comprise water collecting on the ground or in a creek, stream, river, pond, lake, wetland, reservoir, estuary, or ocean. Although not shown in detail in FIG. 2 for purposes of clarity, hollow fibers 110 are equivalent to the hollow fibers illustrated in FIG. 1. In the embodiment of FIG. 2, a reactive gas source 250 is supported by gas support 240. In exemplary embodiments, gas support 240 may be a boat, barge or an artificial island. In other embodiments, gas support 240 may be a support on land. Reactive gas source 250 may a tank, vessel, cylinder, or other suitable gas storage device.

In the embodiment shown, hollow fibers 110 are arranged in cassette 210 so that spaces 215 are left open between the hollow fibers 110. In certain embodiments, hollow fibers may be arranged in rows with defined spacing. Surface water 230 may flow through spaces 215 and interact with the biofilm 130 formed on hollow fibers 110. In the embodiment shown, reactive gas source 250 is in fluid communication with hollow fibers 110 via a coupling component 220. Coupling component 220 may comprise piping and a header or distribution box located proximal to or integral with cassette 210. In this manner, reactive gas source 250 supplies reactive gas to the lumen 105 of hollow fibers 110, and contaminants may be removed from surface water 230 in the manner described above in the discussion of FIG. 1.

Environmental conditions, including the water velocity and the amount of contaminants in surface water 230, can affect the specific parameters and design criteria of isMBfR 200. For example, the environmental conditions can affect the choice of design parameters such as the desired number, length, and spacing of hollow fibers 110 in each cassette 210, the number of cassettes 210, and the size of reactive gas source 250. In certain embodiments the number of hollow fibers 110 in each cassette 210 can range from as few as 10 to as many as 1,000 or more. In specific embodiments, the number of hollow fibers 110 in each cassette may be 10, 20, 30, 40, 50, 60, 70, 80, 90, 100, 200, 300, 400, 500, 600, 700, 800, or 900.

In addition, the length of hollow fibers 110 may range from a few centimeters to several meters or more in length. In specific embodiments, the length of hollow fibers 110 may range from 5 cm, 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 2 m, 3 m, 4 m, 5 m, 6 m, 7 m, 8 m, 9 m, 10 m, 20 m, or 30 m. Furthermore, in exemplary embodiments, the spacing between hollow fibers 110 may range from less than a millimeter to several centimeters or more in length. In specific embodiments, the spacing may range from 0.5 mm, 1.0 mm, 2 mm, 3 mm, 4 mm, 5 mm, 6 mm, 7 mm, 8 mm, 9 mm, 10 mm, 1.5 cm, 2 cm, 2.5 cm, or 3 cm. The number of cassettes may range from one to several hundred or more, depending on the level of contamination and other factors, such as water velocity. In specific embodiments, the number of cassettes may be 1, 2, 3, 4, 5, 6, 7, 8, 9, 10, 20, 30, 40, 50, 60, 70, 80, 90, 100, 150, 200, 250, 300, 350, 400, 450, or 500.

Providing an adequate number of cassettes 210 with a sufficient number and size of hollow fibers 110 can allow isMBfR 200 to effectively remove contaminants from open bodies of surface water. Such systems and methods can therefore provide an attractive solution to treatment of water that is not treatable by current methods or systems.

The foregoing has been a description of certain non-limiting preferred embodiments of the invention. Those skilled in the art will recognize, or be able to ascertain using no more than routine experimentation, many equivalents to the specific embodiments of the invention described herein. Those of ordinary skill in the art will appreciate that various changes and modifications to this description may be made without departing from the spirit or scope of the present invention, as defined in the following claims.

In the claims articles such as "a", "an", and "the" may mean one or more than one unless indicated to the contrary or otherwise evident from the context. Claims or descriptions that include "of" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one, or all of the group members are present in, employed in, or otherwise relevant to a given product or process. Furthermore, it is to be understood that embodiments of the invention encompasses all variations, combinations, and permutations in which one or more limitations, elements, clauses, descriptive terms, etc., from one or more of the claims or from relevant portions of the description is introduced into another claim. For example, any claim that is dependent on another claim can be modified to include one or more limitations found in any other claim that is dependent on the same base claim. Furthermore, where the claims recite a composition, it is to be understood that methods of using the composition for any of the purposes disclosed herein are included, and methods of making the composition according to any of the methods of making disclosed herein or other methods known in the art are included, unless otherwise indicated or unless it would be evident to one of ordinary skill in the art that a contradiction or inconsistency would arise. In addition, embodiments of the invention encompass compositions made according to any of the methods for preparing compositions disclosed herein.

Where elements are presented as lists, e.g., in Markush group format, it is to be understood that each subgroup of the elements is also disclosed, and any element(s) can be removed from the group. It is also noted that the term "comprising" is intended to be open and permits the inclusion of additional elements or steps. It should be understood that, in general, where the invention, or aspects of the invention, is/are referred to as comprising particular elements, features, steps, etc., certain embodiments of the invention or aspects of the invention consist, or consist essentially of, such elements, features, steps, etc. For purposes of simplicity those embodiments have not been specifically set forth in haec verba herein. Thus for each embodiment of the invention that comprises one or more elements, features, steps, etc., the invention also provides embodiments that consist or consist essentially of those elements, features, steps, etc.

Where ranges are given, endpoints are included. Furthermore, it is to be understood that unless otherwise indicated or otherwise evident from the context and/or the understanding of one of ordinary skill in the art, values that are expressed as ranges can assume any specific value within the stated ranges in different embodiments of the invention, to the tenth of the unit of the lower limit of the range, unless the context clearly dictates otherwise. It is also to be understood that unless otherwise indicated or otherwise evident from the context and/or the understanding of one of ordinary skill in the art, values expressed as ranges can assume any sub-range within the given range, wherein the endpoints of the sub-range are expressed to the same degree of accuracy as the tenth of the unit of the lower limit of the range.

In addition, it is to be understood that any particular embodiment of the present invention may be explicitly excluded from any one or more of the claims. Any embodiment, element, feature, application, or aspect of the compositions and/or methods of the invention can be excluded from any one or more claims. For purposes of brevity, all of the embodiments in which one or more elements, features, purposes, or aspects is excluded are not set forth explicitly herein.

REFERENCES

The following list of references are herein incorporated by reference:

U.S. Pat. No. 6,387,262
U.S. Pat. No. 7,186,340
U.S. Patent Publication No. 2005/269263
U.S. patent application Ser. No. 10/876745
U.S. Pat. No. 4,396,507
U.S. Pat. No. 7,118,672
U.S. Patent Publication No. 2006096918
U.S. Pat. No. 7,169,295
U.S. Pat. No. 7,300,571
U.S. Pat. No. 7,303,677
WO2004113239 ("Method for Removing a Pollutant from an Aqueous Medium Using a Membrane")
Lee, K. C. and B. E. Rittmann (2000). A novel hollow-fiber membrane biofilm reactor for autohydrogenotrophic denitrification of drinking water. Water Sci. Technol. 41(4-5): 219-226.
Nerenberg, R. and B. E. Rittmann (2002). Perchlorate as a secondary substrate in a denitrifying hollow-fiber membrane biofilm reactor. Water Sci. Technol.: Water Supply 2(2): 259-265.
Lee, K.-C. and B. E. Rittmann (2002). Applying a novel autohydrogenotrophic hollow-fiber membrane biofilm reactor for denitrification of drinking water. Water Research 36: 2040-2052.
Nerenberg, R., B. E. Rittmann, and I. Najm (2002). Perchlorate reduction in a hydrogen-based membrane-biofilm reactor. J. Amer. Wat. Works Assn. 94(11): 103-114.
Rittmann, B. E. (2002). Hydrogen-based membrane-biofilm reactor solves thorny problems of oxidized contaminants. Membrane Technology, November 2002, pp. 6-10.
Lee. K.-C. and B. E. Rittmann (2003). Effects of pH and precipitation on autohydrogenotrophic denitrification using the hollow-fiber membrane-biofilm reactor. Water Research 37: 1551-1556.
Nerenberg, R., B. E. Rittmann, T. E. Gillogly, G. E. Lehman, and S. S. Adham (2004) Perchlorate reduction using the hollow-fiber membrane-biofilm reactor: bench and pilot-scale studies. Proc. 2003 Battelle Symposium on In Situ and On Site Bioremediation, Orlando, Fla., June 2003. Paper C-08 on CD-ROM.
Rittmann, B. E., R. Nerenberg, K.-C. Lee, I. Najm, T. E. Gillogly, G. E. Lehman, and S. S. Adham (2004). The hydrogen-based hollow-fiber membrane biofilm reactor (HFMBfR) for Reducing Oxidized Contaminants. Water Science and. Technology: Water Supply 4(1): 127-133.
Nerenberg, R. and B. E. Rittmann (2004). Reduction of oxidized water contaminants with a hydrogen-based, hollow-fiber membrane biofilm reactor. Water Sci. Technol. 49(11-12): 223-230.
Adham, S., T. Gillogly, G. Lehman, B. Rittmann, and R. Nerenberg (2005). Membrane Biofilm Reactor Process for Nitrate and Perchlorate Removal. American Water Works Association Research Foundation, Denver, Colo.
Cowman, J. C. Tones, and B. E. Rittmann (2005). Total nitrogen removal in an aerobic/anoxic membrane biofilm reactor system. Water Sci. Technol. 52(7): 115-120.
Rittmann, B. E., R. Nerenberg, B. Stinson, D. Katehis, E. Leong, and J. Anderson (2005). Hydrogen-based membrane biofilm reactor for wastewater treatment. Water Environ. Management.
Adham, S. K.-P. Chiu, G. Lehman, B. E. Rittmann, and J. Chung (2005). Novel Membrane Biofilm Reactor for Groundwater Treatment and Remediation. National Water Research Institute, Irvine, Calif.
Chung, J., R. Nerenberg, and B. E. Rittmann (2006). Bio-reduction of selenate a hydrogen-based membrane biofilm reactor. Environ. Sci. Technol. 40: 1664-1671.
Rittmann, B. E. (2006). The membrane biofilm reactor: the natural partnership of membranes and biofilm, Water Sci. Technol. 53(3): 219-226.
Chung, J., H. Ryu, M. Abbaszadegan, and B. E. Rittmann (2006). Community Structure and Function in an H2-Based Membrane Biofilm Reactor Capable of Bio-reduction of Selenate and Chromate. Appl. Microb. Biotechnol. 72: 1330-1339.
Chung, J., R. Nerenberg, C. Tones, and B. E. Rittmann (2006). Bio-reduction of soluble chromate using a hydrogen-based membrane biofilm reactor. Water Res. 40: 1634-1642.
Chung, J., X. Li, and B. E. Rittmann (2006). Bio-reduction of arsenate using a hydrogen-based membrane biofilm reactor. Chemosphere 40: 24-34.
Chung, J., B. E. Rittmann, W. F. Wright, and R. H. Bowman (2007). Simultaneous bio-reduction of nitrate, perchlorate, selenate, chromate, arsenate, and dibromochloropropane using a hydrogen-based membrane biofilm reactor. Biodegradation 18: 199-209.
Chung, J. and B. E. Rittmann (2007). Bio-reductive dechlorination of 1,1,1-trichloroethane and chloroform using a hydrogen-based membrane biofilm reactor. Biotechnol. Bioengr. 97: 52-60.
Chung, J., R. Nerenberg, and B. E. Rittmann (2007). Simultaneous biological reduction of nitrate and perchlorate in brine water using the hydrogen-based membrane biofilm reactor. J. Environ. Engr., 130: 157-164.
Rittmann, B. E. (2007). The membrane biofilm reactor is a versatile platform for water and wastewater treatment. Environ. Engr. Res., 12(4): 157-175.
Chung, J., C.-H. Ahn, Z. Chen, and B. E. Rittmann (2008). Bio-reduction of N-nitrosodimethylamine (NDMA) using a hydrogen-gased membrane biofilm reactor. Chemosphere 70(3): 516-520.
Nerenberg, R., Y. Kawagoshi, and B. E. Rittmann (2008). Microbial ecology of a hydrogen-based membrane biofilm reactor reducing perchlorate in the presence of nitrate or oxygen. Water Research 42: 1151-1159.

Chung, J., R. Krajmalnik-Brown, and B. E. Rittmann (2008). Bio-reduction of trichloroethene using a hydrogen-based Membrane biofilm reactor. Environ. Sci. Technol. 42(2): 477-483.

Chung, J. and B. E. Rittmann (2008). Simultaneous bio-reduction of trichloroethene, trichloroethane, and chloroform using a hydrogen-based membrane biofilm reactor. Wat. Sci. Technol., 58(30): 495-501.

The invention claimed is:

1. A system for in situ treatment of surface water, comprising:
   a source of reactive gas; and
   a plurality of hollow-fiber components in fluid communication with the source of reactive gas, wherein the hollow-fiber components comprise:
      an inlet, wherein the inlet is coupled to the source of reactive gas via a coupling component;
      a membrane configured to allow the reactive gas to diffuse through the membrane;
      an end member to restrict the reactive gas from exiting hollow fiber components Without diffusing through the membrane; and
      a biofilm including bacteria capable of consuming the reactive gas, wherein the hollow-fiber components are placed within the surface water.

2. The system of claim 1 wherein the surface water is selected from the group consisting of within a natural or man-made wetland, underneath an artificial island, underneath a moored boat, underneath a barge, underneath a mobile boat, a side channel of a river, and a body of flowing water.

3. The system of claim 1 wherein the plurality of hollow-fiber components are arranged in a cassette.

4. The system of claim 1 wherein a plurality of spaces between hollow-fiber components are dimensioned sufficient for transverse movement of water about said hollow-fiber components.

5. The system of claim 1 wherein the reactive gas is hydrogen ($H_2$).

6. The system of claim 5 wherein said hollow-fiber components have hydrogen-oxidizing bacteria thereon.

7. The system of claim 6 wherein nitrate ($NO_3^-$) and/or nitrite ($NO_2^-$) are reduced by the hydrogen-oxidizing bacteria to nitrogen gas ($N_2$).

8. The system of claim 6 wherein a contaminant is reduced to a non-toxic end product.

9. The system of claim 8 wherein the contaminant is selenate ($SeO_4^{2-}$), chromate ($CrO_4^{2-}$), perchlorate ($ClO_4^-$), trichloroethene ($C_2Cl_3H$), tetrachloroethene ($C_2Cl_4$), dichloroethene ($C_2H_2Cl_2$), vinyl chloride ($C_2H_3Cl$), dibromochloropropane ($C_3H_5Br_2Cl$), or nitrosodimethylamine ($C_2H_6N_2O$).

10. The system of claim 9 wherein two or more of the contaminants are reduced.

11. The system of claim 1 wherein the reactive gas is oxygen ($O_2$).

12. The system of claim 11 wherein ammonium ($NH_4^+$), benzene ($C_6H_6$), phenol ($C_6H_6O$), or other organic pollutants are oxidized by the reactive gas.

13. The system of claim 11 wherein a contaminant oxidized by the reactive is an aggregate of many organic compounds measured as biochemical oxygen demand (BOD).

14. The system of claim 11 wherein two or more of the contaminants are oxidized.

15. A method for removing a contaminant from a body of surface water, the method comprising:
   providing a plurality of tubular members in the body of surface water, wherein the tubular members each comprise an internal lumen and a wall, wherein the wall has an inner surface proximal to the internal lumen and an outer surface proximal to the environment, wherein the tubular members comprise an inlet and an end member to restrict the reactive gas from exiting tubular members without diffusing through the tubular members;
   providing a source of reactive gas in fluid communication with the internal lumens of the tubular members;
   providing a coupling component to couple the source of reactive gas to the inlet;
   allowing a film of bacteria to form on the outer surfaces of the walls of the tubular members;
   diffusing the reactive gas through the walls of the tubular members;
   consuming the reactive gas with the bacteria; and
   transforming the contaminant into a non-toxic end product.

16. The method of claim 15 wherein the surface water is selected from the group consisting of within a natural or man-made wetland, underneath an artificial island, underneath a moored boat, underneath a barge, underneath a mobile boat, a side channel of a river, body of flowing water.

17. The method of claim 15 wherein the plurality of tubular members are arranged in a cassette.

18. The method of claim 15 wherein the tubular members are spaced apart sufficient for transverse movement of water about said walls of said tubular members.

19. The method of claim 15 wherein the reactive gas is hydrogen ($H_2$) so that the contaminant is reduced or oxygen ($O_2$).

20. A system for in situ treatment of surface water, comprising:
   a source of reactive gas; and
   a plurality of hollow-fiber components in fluid communication with the source of reactive gas, wherein the hollow-fiber components include:
      an inlet coupled to the source of reactive gas;
      a membrane configured to allow the reactive gas to diffuse through the membrane;
      an end member to restrict the reactive gas from exiting hollow fiber components Without diffusing through the membrane; and
      a biofilm including bacteria capable of consuming the reactive gas wherein the hollow-fiber components are placed within the surface water, wherein the plurality of hollow-fiber components are arranged in a cassette.

* * * * *

UNITED STATES PATENT AND TRADEMARK OFFICE
CERTIFICATE OF CORRECTION

PATENT NO.       : 8,394,273 B2  
APPLICATION NO.  : 12/920075  
DATED            : March 12, 2013  
INVENTOR(S)      : Bruce E. Rittmann Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 232 days.

Signed and Sealed this

First Day of September, 2015

Michelle K. Lee
*Director of the United States Patent and Trademark Office*